United States Patent [19]

Kilmer et al.

[11] Patent Number: 4,751,452

[45] Date of Patent: Jun. 14, 1988

[54] BATTERY OPERATED POWER WRAP TOOL

[75] Inventors: Paul R. Kilmer, Leroy, Mich.; David S. Chapin, Raleigh, N.C.

[73] Assignee: Cooper Industries, Houston, Tex.

[21] Appl. No.: 47,225

[22] Filed: May 7, 1987

Related U.S. Application Data

[63] Continuation-in-part of Ser. No. 832,484, Feb. 24, 1986, abandoned.

[51] Int. Cl.[4] ........................ H02J 7/00; H01M 10/44

[52] U.S. Cl. ........................................ 320/2; 310/50; 320/3; 429/9; 429/99

[58] Field of Search ..................... 320/2, 3, 25; 429/9, 429/96–100; 310/50

[56] References Cited

U.S. PATENT DOCUMENTS

| | | | |
|---|---|---|---|
| 4,147,163 | 4/1979 | Newman etal. .................... | 320/2 X |
| 4,382,219 | 5/1983 | Heine et al. ............................ | 320/2 |
| 4,447,749 | 5/1984 | Reeb, Jr. et al. .................. | 320/2 X |

*Primary Examiner*—R. J. Hickey
*Attorney, Agent, or Firm*—E. E. Scott; A. R. Thiele

[57] ABSTRACT

A portable power tool for forming wire wrap type connections includes an electric motor, a torque transmitter and a casing for enclosing the electric motor and the torque transmitter. Removably mounted to the casing is a battery pack. The battery pack mounts both rechargeable and non-rechargeable batteries so that the battery charger may not be recharged in a physically compatible battery pack when non-rechargeable batteries are contained within the battery pack.

1 Claim, 4 Drawing Sheets

Fig.1
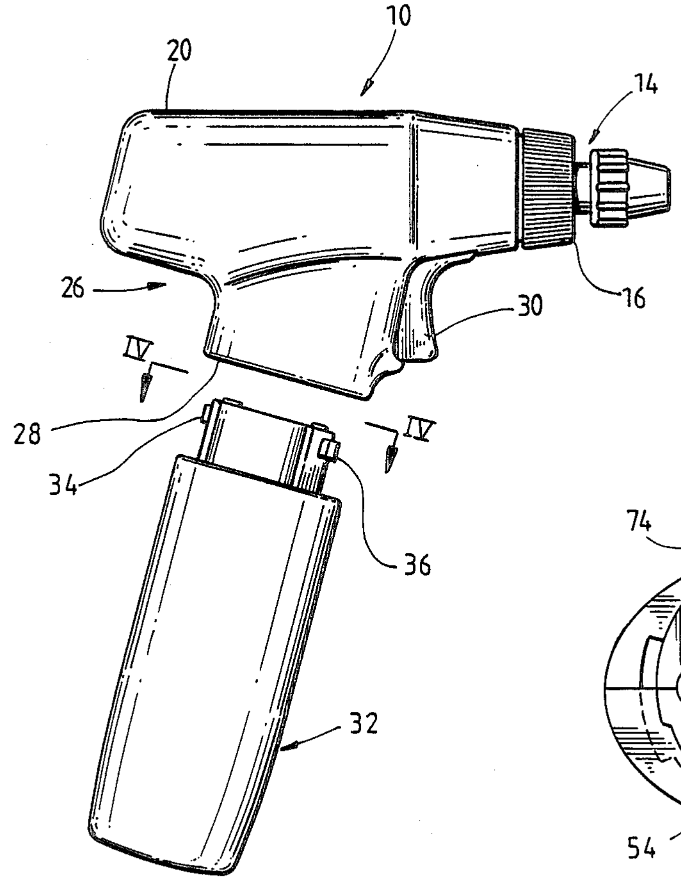
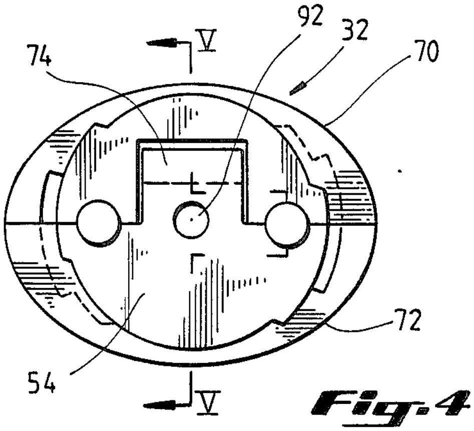
Fig.4
Fig.5
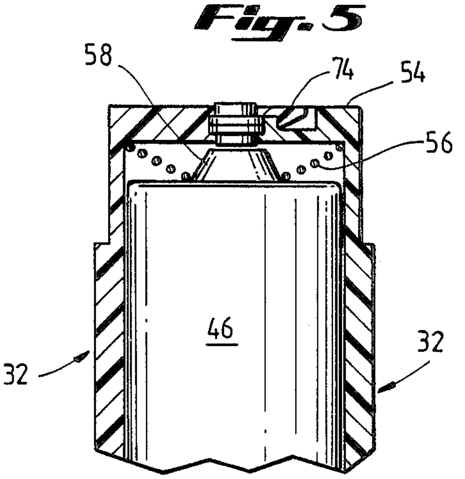
Fig.6
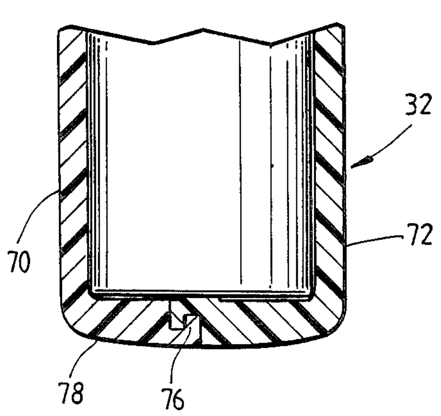

BATTERY OPERATED POWER WRAP TOOL

This application is a continuation-in-part of U.S. patent application Ser. No. 832,484 filed Feb. 24, 1986, now abandoned.

BACKGROUND OF THE INVENTION

The present invention relates to portable power tools more specifically, the present invention relates to battery operated portable power tools.

The use of portable power tools to perform various tasks has become increasingly widespread. One example of such a portable power tool is a wire wrapping tool which is used to form a solderless connection between a wire and an electrical connector or terminal. Newer portable power tools are powered by a battery pack which contains a rechargeable battery. When the rechargeable battery in the battery pack runs down, all the operator need do is replace the battery pack with one containing a fresh battery. In the meantime, the battery pack containing the exhausted battery is placed in a battery charger. Oftentimes, however, a battery charger or a source of electricity for powering the battery charger is not available to the tool operator. Consequently, the operator finds himself without battery power before his job is complete. While standard, non-rechargeable flashlight batteries may be readily available to the operator, the tool operator finds that such readily available batteries are not usable with his portable power tool as they do not fit within the cavity in the battery pack. Additionally, if standard, non-rechargeable flashlight batteries are placed in a battery charger a significant danger of damage to the batteries or to the user is present. Such damage to the batteries might include a leak of caustic acid from the battery casing. The possible damage to the user comes from the potential for explosion when non-rechargeable batteries are placed in a battery charger. As there is nothing on the outside of a power tool battery pack to indicate if rechargeable or non-rechargeable batteries are being used, there is a need to prevent the battery pack from being placed in a battery charger when non-rechargeable batteries are contained therein.

It is therefore necessary to provide a portable power tool including a battery pack and battery pack charger which enables utilization of both rechargeable and non-rechargeable batteries but prevents the recharging of non-rechargeable batteries by use of a battery charger.

SUMMARY OF THE INVENTION

A portable power tool of the type used for solderless electrical connections formed by wrapping wire around a post or a terminal includes an electric motor and torque transmission means to transfer the torque developed by the electric motor to the work piece. The electric motor and the torque transmission means are enclosed in a casing.

Removably mountable to the casing is a battery pack which serves as a handle for the portable power tool. The battery pack is designed to contain either sub-"C" size rechargeable or "C" size non-rechargeable batteries. Further included within the battery pack is a spring mounting arrangement which, in addition to positioning the batteries within the battery pack, transmits electrical energy to the electric motor contained within the casing of the portable power tool. The shape of the interior of the battery pack positions rechargeable batteries such that the battery pack with a rechargeable battery contained therein may be inserted in a compatible battery pack recharger. If the battery pack happens to contain "C" size non-rechargeable batteries, the shape of the interior of the battery pack will position the batteries so that the battery pack with the non-rechargeable batteries contained therein cannot be inserted into the battery pack recharger which is part of the power tool system of the present invention.

BRIEF DESCRIPTION OF THE DRAWINGS

A better understanding of the device of the present invention may be had by reference to the drawings wherein:

FIG. 1 is a front elevational view of the portable power tool of the present invention;

FIG. 4 is a top view of the battery pack;

FIG. 5 is a view taken along line V—V of FIG. 4;

FIG. 6 is a view taken along line VI—VI of FIG. 2;

DETAILED DESCRIPTION OF THE EMBODIMENTS

Figure 2:
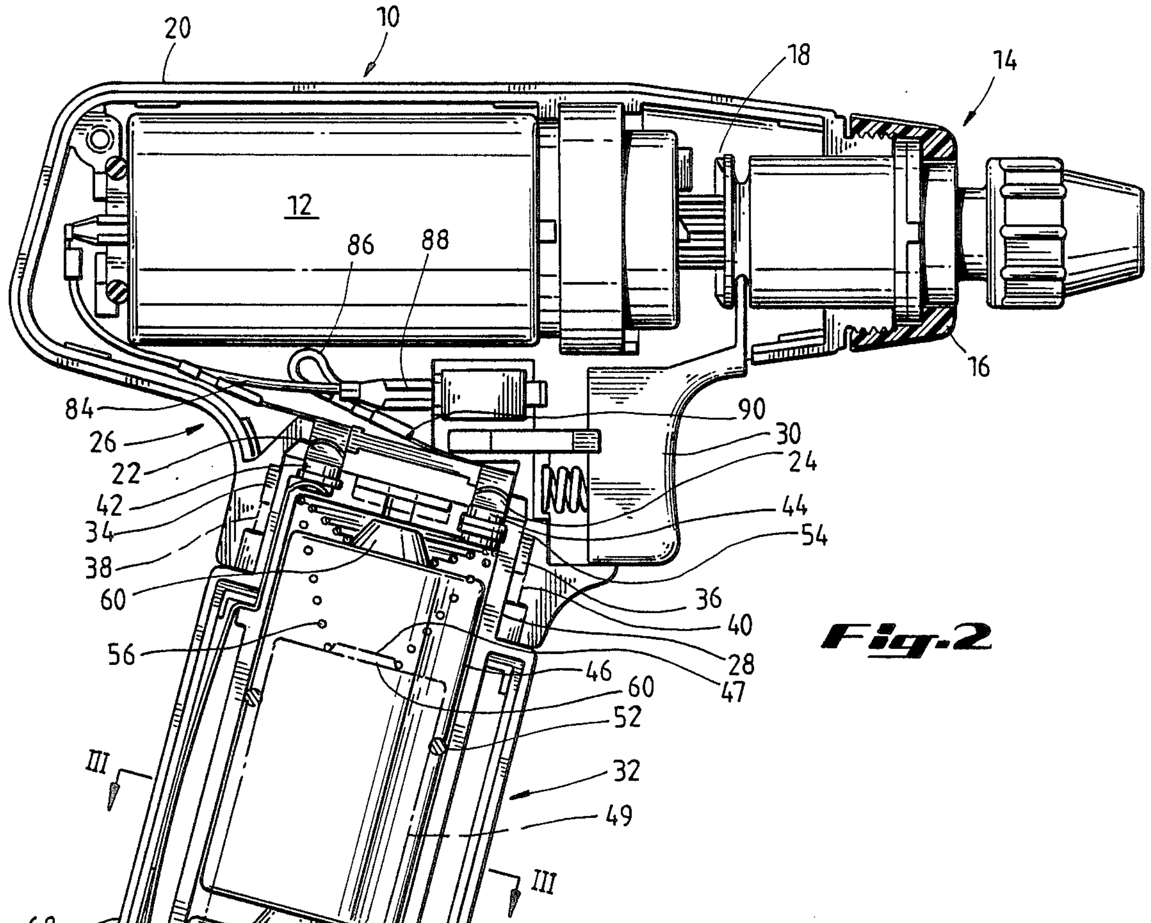
FIG. 2 is a front elevational view in partial section of the power tool shown in FIG. 1 with a side cover removed.

As shown in FIGS. 1 and 2 a portable power tool 10 typically of the type used to form wire wrap connections around electrical connectors or terminals (not shown) is powered by an electric motor 12. Electric motor 12 in portable power tool 10 provides torque to the collar and bit retaining section 14 at the operative end 16 of wire wrapping tool 10. In order to provide proper speeds and torques for wrapping wire the power from electric motor 12 is passed through a power transmission section 18 before reaching those parts of tool 10 which actually wrap wire around a connector or terminal. Enclosing both motor 12 and power transmission section 18 of portable tool 10 is a casing 20. Electrical connections 22 and 24 from electric motor 12 are mounted at the bottom 26 of casing 20 in opening 28 just behind trigger 30 which acts as an on and off switch for wire wrapping tool 10. Mounted within opening 28 is a battery pack 32. Battery pack 32 is mounted within opening 28 by two ear members 34 and 36 which fit into compatible slots 38 and 40 within opening 28 at bottom 26 of power tool 10. When engaged in opening 28, battery pack 32 has two electrical connections 42 and 44 which are placed into physical contact with the two compatible electrical connections 22 and 24 in bottom 26 of a portable power tool 10.

As best shown in FIG. 2 the battery pack 32 is sized so as to accommodate both standard non-rechargeable "C" size (flashlight) batteries 46 and a "sub-C" size rechargeable battery 48 (shown in phantom). There are some commonly available "C" size batteries 46 which are rechargeable; however when the battery pack is closed there is no way of telling if non-rechargeable or rechargeable "C" size batteries are enclosed. Therefore, for maximum safety, whenever any standard "C" size batteries are enclosed in the battery pack 32 it cannot be recharged. If a battery pack recharger 50 such as the one shown in FIG. 7A designed for use with the battery pack 32 of the present invention used with standard "C" size batteries 46 of the non-rechargeable variety, a leak may develop in the "C" size batteries or the "C" size batteries themselves may explode. Both situations are potentially hazardous for the user of portable power tool 10. Such is not the case with rechargeable batteries as their internal design permits recharging. Therefore, the system of the present inventions protects the user by physically preventing the insertion of the battery pack 32 into the recharger 50 supplied with the present system if either rechargeable or non-rechargeable standard "C" size cells are placed in the battery pack 32.

As "sub-C" battery 48 is somewhat smaller in both diameter and length than the combination of two "C" size batteries 46, provision must be made for a accommodating both sizes of batteries within battery pack 32. This accommodation is accomplished in part by the use of two O-rings 52 which are slipped around the outside 49 of "sub-C" size battery 48. As best seen in FIGS. 2 and 5, at top 54 of battery pack 32 is a helical spring 56. Helical spring 56 is sized so that when two standard "C" size batteries 46 are used, helical spring 56 will engage top portion 58 of the uppermost battery or top 47 of the rechargeable battery and provide a complete electrical path between the uppermost or positive battery terminal 60 and one of the electrical connections 44 in battery pack 32 which engage electrical connections 22 and 24 to motor 12 within casing 20. As may be seen in FIG. 7B, the other electrical connection is a spring strap 62 which is mounted within battery pack 32 to engage the bottom of either the pair of standard "C" cells 64 or the bottom of rechargeable battery 66. Spring strap 62 travels up side 68 of battery pack 32 to the other electrical terminal 42 in top 54 of battery pack 32. Because helical spring 56 is expandable, either "sub-C" type battery 48 or the pair of "C" type batteries 46 may be used in battery pack 32.

Figure 3:
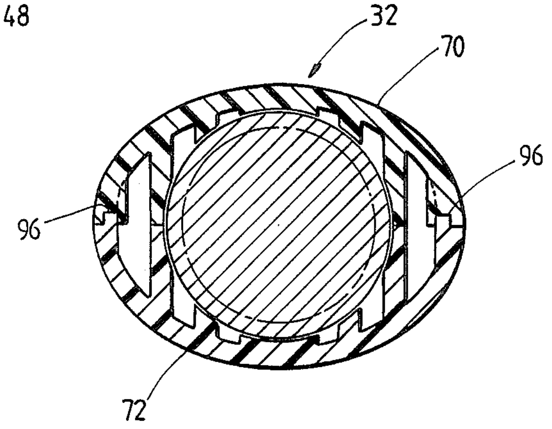
FIG. 3 is a view taken along line III—III in FIG. 2.

As best shown in FIGS. 3, 4 and 6 the battery pack 32 itself is constructed in two halves 70 and 72. This enables either the pair of standard "C" size cells 46 or the "sub-C" cell 48 to be easily removed and replaced should such replacement be required.

As best shown in FIGS. 4, 5 and 6 the two halves of the battery pack 70 and 72 are connected by latches 74 and 76 at top 54 and at bottom 78, respectively. These latches 74 and 76 enable the user to separate halves 70 and 72 of battery pack 32 by merely inserting a small tool under top latch 74 and causing battery pack halves 70 and 72 to separate. This ease of operation eliminates the cumbersome task of removing a screw or a nut to gain access to the batteries. As best shown in FIG. 3, a tongue and groove joint 96 is used on side 68 of battery pack 32 to position halves 70 and 72 one with respect to the other.

OPERATION OF THE DEVICE

As can be best shown by reference to FIGS. 1 and 2 battery operated portable wire wrapping device 10 is used by inserting battery pack 32 in opening 28 in casing 20 of portable power tool 10. Battery pack 32 is then twisted until it locks in position. This twisting motion not only causes ears 34 and 36 to engage slots 38 and 40, but also causes electrical connections 42 and 44 at top 54 of battery pack 32 to mate with electrical connections 22 and 24 mounted in casing 20 of portable power tool 10. Beginning at the bottom of the battery or the negative terminal, an electrical current path is provided from either the negative terminal of the "C" size battery 80 or the negative terminal of the "sub-C" rechargeable battery 82 through spring strap 62 which travels up along side 68 of battery pack 32 through terminal 42 at top 54 of the battery pack 32 to terminal 22 in casing 20 of portable power tool 10 and thence to electric motor 12.

Figure 8:
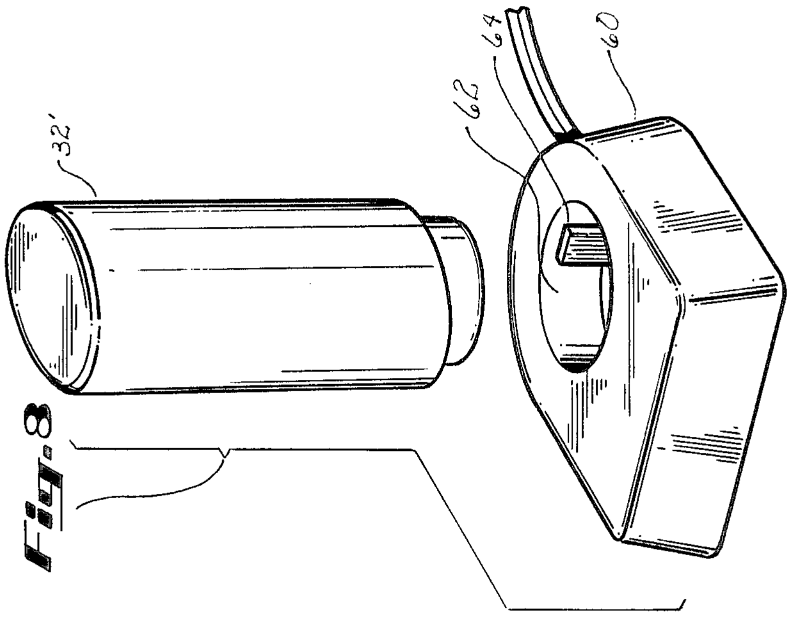
FIG. 8 is an electrical schematic of the tool power circuit.

The electric circuit shown in FIG. 8 is completed when electrical energy travels through leads 84 and 86 exiting electric motor 12 and thence through connectors 88 and 90 formed within casing 20 of portable power tool 10 and on to the positive end of either the rechargeable or non-rechargeable battery 60 through helical spring 56 which is positioned on top 54 of battery pack 32.

Should the operator desire to reverse the direction of rotation of the power tool 10 he simply removes battery pack 32 from casing 20 and rotates it 180°. This reversal of battery pack 32 will reverse the electrical polarity seen by electric motor 12, consequently, electric motor 12 will turn in an opposite direction. Ears 34 and 36 and compatible slots 38 and 40 are sized to permit the reversal of battery pack 32.

Figure 7:
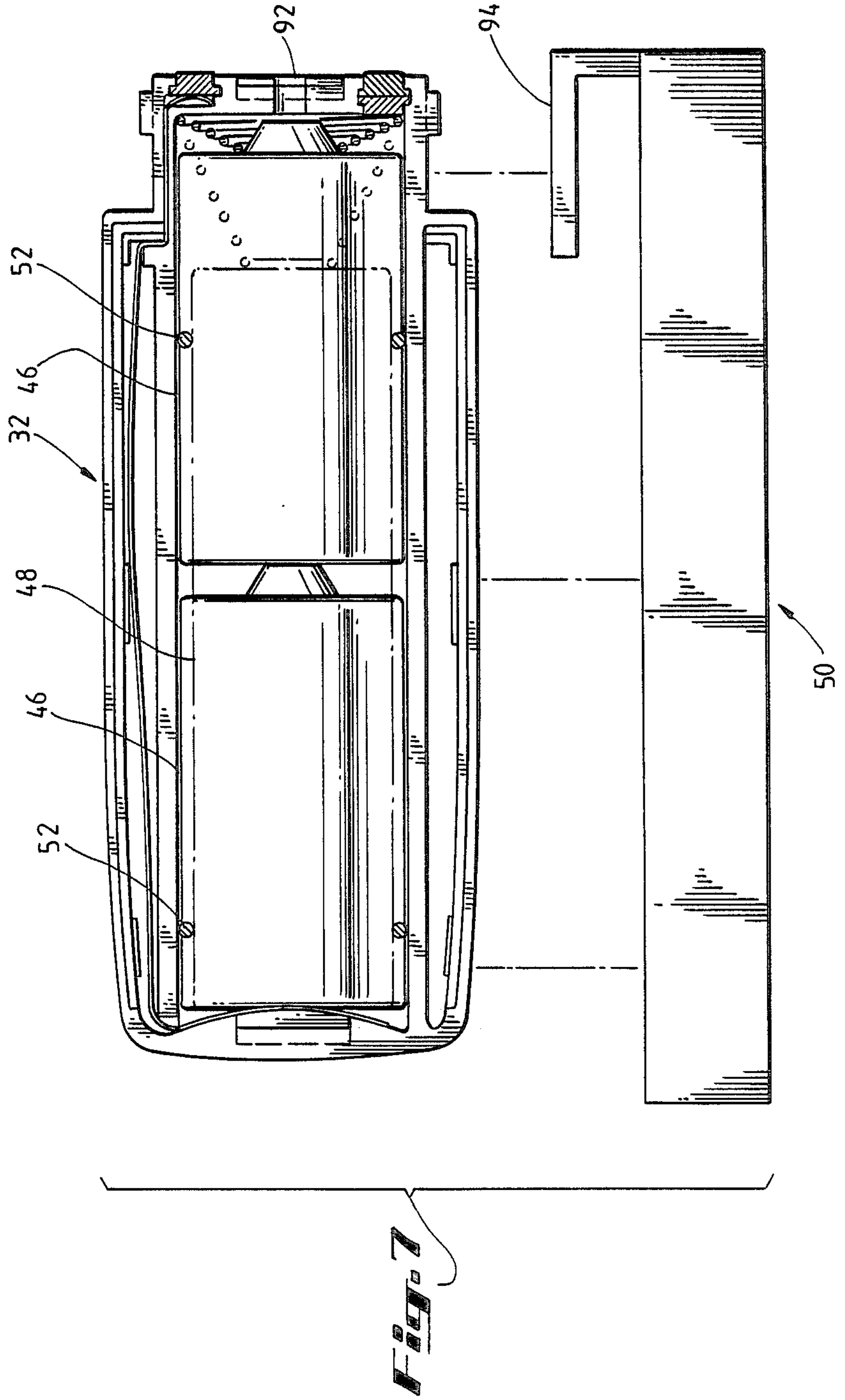
FIG. 7A is a perspective view of the battery pack in relation to the battery pack recharger.
FIG. 7B is a sectional view of one embodiment of the battery pack.

When it is desired to recharge the batteries within battery pack 32, battery pack 32 is removed from power tool casing 20 by twisting battery pack 32 with respect to casing 20. This causes ears 34 and 36 to exit slots 38 and 40. As shown in FIG. 7A battery pack 32 is then placed in a compatible battery pack recharger 50 where a preselected current is applied to the batteries to restore their electrical potential. If the non-rechargeable batteries or the standard "C" size cells 46 are used in battery pack 32, the end of battery cells 46 will be approximately flush with the end of battery pack 32. This position of standard "C" size cells 46 within battery pack 32 will not permit battery pack 32 to be positioned within compatible battery pack recharger 50. This is because probe 94 within battery pack recharger 50 must be inserted into the interior of battery pack 32 through aperture 92 (FIG. 4) for battery pack 32 to be inserted in battery pack recharger 50. With two standard "C" size cells 46 in battery pack 32, battery pack 32 itself will not be mountable within battery pack recharger 50 hence battery pack 32 with non-rechargeable "C" size cells 46 contained therein cannot be recharged. It is only when battery pack 32 contains a rechargeable cell 48 therein that probe 94 will enter the interior of battery pack 32 through aperture 92 thus allowing battery pack 32 to be placed in battery pack recharger 50 and rechargeable battery 48 recharged. When it is desired to use regenerated battery pack 32 with portable power tool 10, battery pack 32 is removed from battery pack recharger 50 and reinserted into casing 20 of portable power tool 10.

Recharger 50 contains slots 34A and 36A. These two slots are of different sizes so that ears 34 and 36 may only enter slots 34A and 36A in one way. This prevents improperly reversing the polarity of the recharger 50 with respect to battery pack 32. Casing 20 and/or the housing surrounding the batteries in battery pack 32 may be formed of a strong, impact resistant insulating material. Particularly, a rubber or plastic based compound is exemplary of what may be used. Helical spring 56 or spring strap 62 in battery pack 32 may be any type of electrically conductive resilient and corrosion resistant material.

Figure 10:
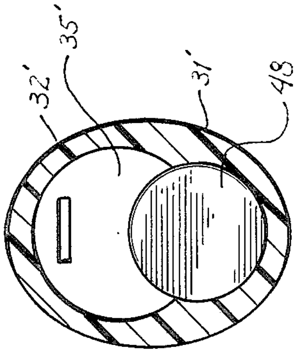
FIG. 10 is a top view of the battery pack shown in FIG. 9 with a rechargeable cell.
Figure 9:
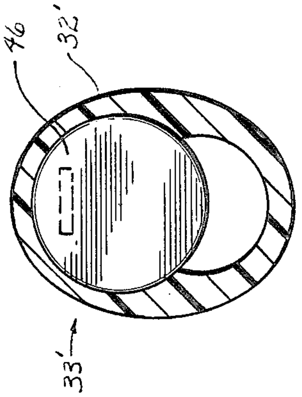
FIG. 9 is a top view of an alternate embodiment of the battery pack containing standard C cells.

An alternate embodiment of battery pack 32 is shown in FIGS. 9 and 10. Rather than relying on the difference in length between the standard "C" non-rechargeable cell and the rechargeable cell, battery pack 32' relies on the difference in diameter of the batteries for proper positioning. As may be specifically seen by comparing FIG. 9 to FIG. 10 when standard "C" cells 46 are inserted into battery pack 32' they will only fit in the upper portion 33' of battery pack 32'. When rechargeable cells 48 are inserted into the battery pack 32' they will only fit into lower portion 31' of battery pack 32'. Such arrangement eliminates the need to use O-rings 52. Herein probe 94 (FIG. 7A) must be located so that it will fit within space 100 to allow recharging of "sub-C" batteries and prevent the recharging of "C" size batteries.

There is now provided by the portable power tool 10 of the present invention, a portable power tool 10 which may utilize either rechargeable or non-rechargeable batteries. The positioning of the batteries within battery pack prevents the operator from inadvertently creating a dangerous situation by inserting the battery pack containing non-rechargeable batteries into a compatible battery charger.

While the present invention has been described in accordance with the preferred embodiment of a wire wrapping tool, it is to be understood that the true scope and nature of the invention has applicability to other portable power tools and is to be only defined by a reading of the claims by one of ordinary skill in the art with appropriate reference to the specification and drawings.

I claim:

1. A battery operated wire wrapping tool power system comprising in operative combination:
   - a battery charger;
   - an electric motor;
   - means for transmitting torque from said electric motor to a wire wrapping bit;
   - a casing to enclose both the electric motor and the means for transmitting torque to said wire wrapping bit;
   - a battery pack constructed and arranged to be removably mountable within the battery operated wire wrapping tool to provide a handle for the battery operated wire wrapping tool, said battery pack having:
     - means for transmitting electrical energy from either rechargeable or non-rechargeable batteries to the battery operated wire wrapping tool;
     - means for mounting both rechargeable and non-rechargeable batteries within said battery pack, said means for mounting both rechargeable and non-rechargeable batteries within said battery pack constructed and arranged to prevent said battery pack from being placed in said battery charger when said battery pack contains non-rechargeable batteries by utilizing the difference in diameter of said batteries to distinguish the position of said rechargeable from said non-rechargeable batteries.

* * * * *